(12) United States Patent
Wang et al.

(10) Patent No.: US 11,861,498 B2
(45) Date of Patent: Jan. 2, 2024

(54) METHOD AND APPARATUS FOR COMPRESSING NEURAL NETWORK MODEL

(71) Applicant: BEIJING BAIDU NETCOM SCIENCE TECHNOLOGY CO., LTD., Beijing (CN)

(72) Inventors: Guibin Wang, Beijing (CN); Shijun Cong, Beijing (CN); Hao Dong, Beijing (CN); Lei Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/968,688

(22) Filed: Oct. 18, 2022

(65) Prior Publication Data

US 2023/0177326 A1 Jun. 8, 2023

(30) Foreign Application Priority Data

Dec. 2, 2021 (CN) .......................... 202111457675.5

(51) Int. Cl.
*G06N 3/08* (2023.01)
*G06N 3/04* (2023.01)
*G06N 3/045* (2023.01)

(52) U.S. Cl.
CPC .............. *G06N 3/08* (2013.01); *G06N 3/045* (2023.01)

(58) Field of Classification Search
CPC ................................. G06N 3/08; G06N 3/045
See application file for complete search history.

(56) References Cited

U.S. PATENT DOCUMENTS

| 2019/0228284 | A1 | 7/2019 | Holland et al. | |
| 2020/0372320 | A1* | 11/2020 | Lin | H03M 7/3077 |
| 2021/0019616 | A1* | 1/2021 | Chen | G06N 7/046 |
| 2021/0089922 | A1* | 3/2021 | Lu | G06N 3/063 |
| 2021/0357758 | A1* | 11/2021 | Huang | G06N 3/063 |

FOREIGN PATENT DOCUMENTS

| CN | 110443359 | A1 | 11/2019 |
| CN | 110555521 | A1 | 12/2019 |
| CN | 111033531 | A1 | 4/2020 |
| CN | 113168554 | A1 | 7/2021 |

(Continued)

OTHER PUBLICATIONS

Jain et al, "Architectural Support for Convolutional Neural Networks on Modern CPUs", 2018 (Year: 2018).*

(Continued)

*Primary Examiner* — Selene A. Haedi
(74) *Attorney, Agent, or Firm* — Brooks Kushman P.C.

(57) ABSTRACT

A method for compressing a neural network model includes acquiring a to-be-compressed neural network model. A first bit width, a second bit width and a target thinning rate corresponding to the to-be-compressed neural network model are determined. A target value is obtained according to the first bit width, the second bit width and the target thinning rate. Then the to-be-compressed neural network model is compressed using the target value, the first bit width and the second bit width to obtain a compression result of the to-be-compressed neural network model.

17 Claims, 6 Drawing Sheets

(56) References Cited

FOREIGN PATENT DOCUMENTS

| CN | 113269312 A1 | 8/2021 |
|---|---|---|
| WO | 2019091401 A1 | 5/2019 |
| WO | 2020133492 A1 | 7/2020 |

OTHER PUBLICATIONS

Lei et al., "Survey of Deep Neutral Network Model Compression", Journal of Software vol. 2, Dec. 4, 2017.
Extended European Search Report of European application No. 22202175.0 dated Mar. 28, 2023, 10 pages.

* cited by examiner

METHOD AND APPARATUS FOR COMPRESSING NEURAL NETWORK MODEL

CROSS-REFERENCE TO RELATED APPLICATIONS

The present disclosure claims the priority and benefit of Chinese Patent Application No. 202111457675.5, filed on Dec. 2, 2021, entitled "METHOD AND APPARATUS FOR COMPRESSING NEURAL NETWORK MODEL." The disclosure of the above application is incorporated herein by reference in its entirety.

TECHNICAL FIELD

The present disclosure relates to the field of computer processing technologies, particularly to the field of artificial intelligence technologies, such as deep learning technologies, cloud service technologies, or the like, and more particularly to a method and apparatus for compressing a neural network model, an electronic device and a readable storage medium.

BACKGROUND

Currently, deep learning-based voice recognition, image detection and other technologies have increasingly wide applications in daily life. In order to continuously improve precision of a neural network model during recognition and detection, complexity and a parameter quantity of the neural network model are continuously increased.

In order to better popularize an artificial intelligence technology and reduce a practice cost of artificial intelligence, how to compress the volume of the neural network model while guaranteeing the precision of the neural network model as far as possible is a long-term problem for practice of the artificial intelligence technology.

SUMMARY

According to a first aspect of the present disclosure, there is provided a method for compressing a neural network model, including: acquiring a to-be-compressed neural network model; determining a first bit width, a second bit width and a target thinning rate corresponding to the to-be-compressed neural network model; obtaining a target value according to the first bit width, the second bit width and the target thinning rate; and compressing the to-be-compressed neural network model using the target value, the first bit width and the second bit width to obtain a compression result of the to-be-compressed neural network model.

According to a second aspect of the present disclosure, there is provided an electronic device, including: at least one processor; and a memory connected with the at least one processor communicatively, where the memory stores instructions executable by the at least one processor to enable the at least one processor to perform the method as mentioned above.

According to a third aspect of the present disclosure, there is provided a non-transitory computer readable storage medium with computer instructions stored thereon, where the computer instructions are used for causing a computer to perform the method as mentioned above.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and mechanisms are omitted in the descriptions below.

Figure 1:
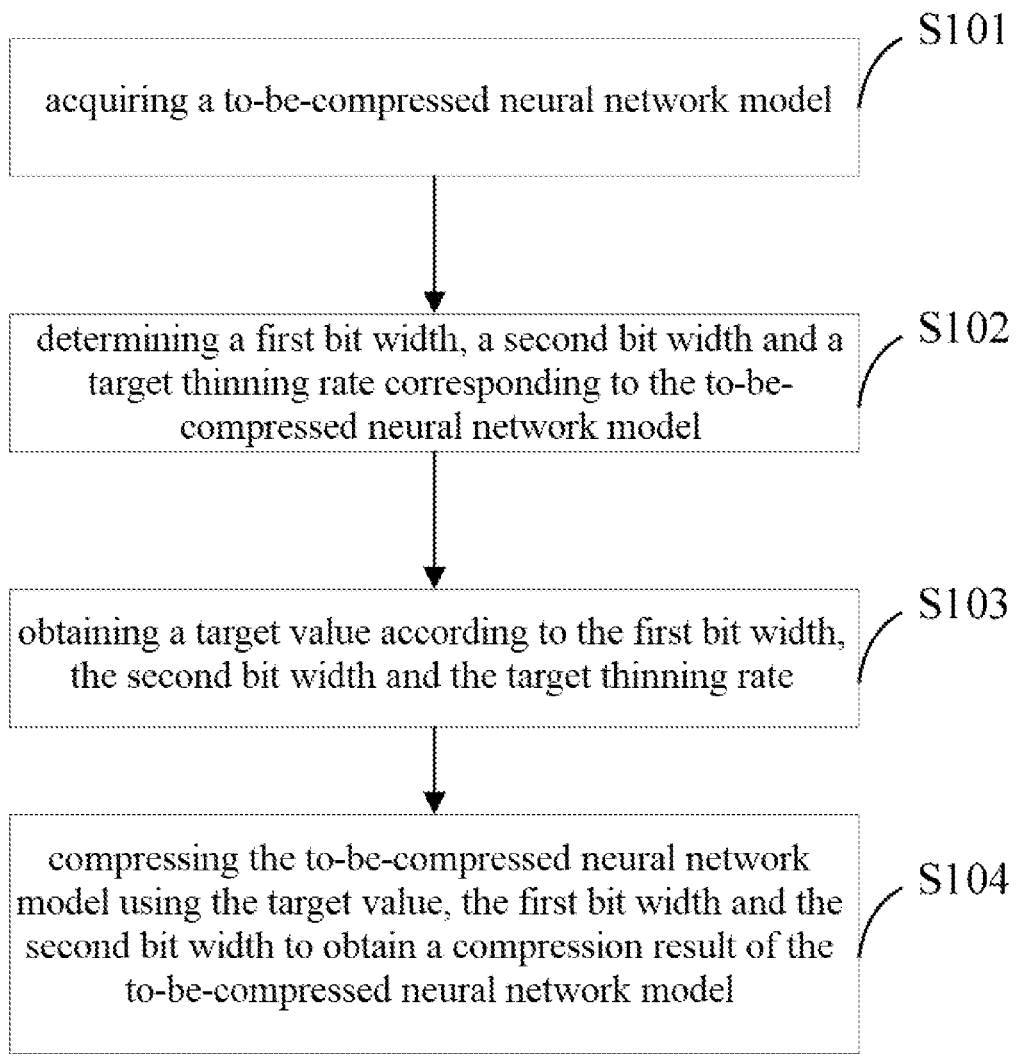
FIG. 1 is a schematic diagram according to a first embodiment of the present disclosure.

FIG. 1 is a schematic diagram according to a first embodiment of the present disclosure. As shown in FIG. 1, a method for compressing a neural network model according to this embodiment includes the following steps:

S101: acquiring a to-be-compressed neural network model;

S102: determining a first bit width, a second bit width and a target thinning rate corresponding to the to-be-compressed neural network model;

S103: obtaining a target value according to the first bit width, the second bit width and the target thinning rate; and S104: compressing the to-be-compressed neural network model using the target value, the first bit width and the second bit width to obtain a compression result of the to-be-compressed neural network model.

The method for compressing a neural network model according to this embodiment includes the steps of firstly, determining the first bit width, the second bit width and the target thinning rate corresponding to the acquired to-be-compressed neural network model; secondly, obtaining the target value according to the target thinning rate, the first bit width and the second bit width; and finally, compressing the to-be-compressed neural network model using the target value, the first bit width and the second bit width to obtain the compression result of the to-be-compressed neural network model; in this embodiment, the neural network model is compressed by the determined first bit width, second bit width and target thinning rate, thereby ensuring that the obtained compression result has higher precision, simplifying compression steps of the neural network model, and improving a compression efficiency of the neural network model.

In this embodiment, during the S101 of acquiring the to-be-compressed neural network model, a neural network model input at an input end may be used as the to-be-compressed neural network model, or a neural network model selected on a network at the input end may be used as the to-be-compressed neural network model.

In this embodiment, after the S101 of acquiring the to-be-compressed neural network model, the S102 of determining the first bit width, the second bit width and the target thinning rate corresponding to the acquired to-be-compressed neural network model is executed.

In this embodiment, during the S102, the first bit width, the second bit width and the target thinning rate input or selected at the input end may be acquired as the first bit width, the second bit width and the target thinning rate corresponding to the acquired to-be-compressed neural network model.

In order to enable the compression result of the to-be-compressed neural network model to be better matched with a processor for running the to-be-compressed neural network model, in this embodiment, during the S102 of determining the first bit width corresponding to the to-be-compressed neural network model, an adopted optional implementation may include: determining a processor for running the acquired to-be-compressed neural network model; and taking a vector width of the determined processor as the first bit width corresponding to the to-be-compressed neural network model.

It may be understood that one processor is equivalent to a vector system structure, and different processors have different vector widths; for example, the vector width of an Intel Avx2 processor is 256 bits, and the vector width of an Arm neon processor is 128 bits.

In order to enable the compression result of the to-be-compressed neural network model to be better matched with an instruction set in the processor for running the to-be-compressed neural network model, in this embodiment, during the S102 of determining the second bit width corresponding to the to-be-compressed neural network model, an adopted optional implementation may include: determining the processor for running the acquired to-be-compressed neural network model; and determining the second bit width corresponding to the to-be-compressed neural network model according to a vector width of the instruction set in the determined processor.

In this embodiment, during the S102 of determining a second bit width corresponding to the to-be-compressed neural network model according to a vector width of the instruction set in the determined processor, a vector width of an instruction supported by the instruction set may be directly used as the second bit width, or a vector width less than the vector width of the instruction supported by the instruction set may be used as the second bit width.

For example, if the instruction set in the determined processor supports calculation of an int8 instruction, in this embodiment, a vector width of 8 bits may be used as the second bit width corresponding to the to-be-compressed neural network model, or a vector width of 4 bits or a vector width of 1 bit less than 8 bits may be used as the second bit width corresponding to the to-be-compressed neural network model.

In addition, in this embodiment, during the S102 of determining a target thinning rate corresponding to the to-be-compressed neural network model, an adopted optional implementation may include: acquiring attribute information of the to-be-compressed neural network model, the attribute information in this embodiment being type information, task information, or the like, of the to-be-compressed neural network model; and taking a thinning rate corresponding to the determined attribute information as the target thinning rate corresponding to the to-be-compressed neural network model.

That is, in this embodiment, a corresponding relationship between the attribute information and the thinning rate may be preset, and then, the target thinning rate is determined according to the attribute information of the to-be-compressed neural network model, thus avoiding that the compression result of the to-be-compressed neural network model is affected by an inappropriate target thinning rate, and then improving accuracy of the determined target thinning rate.

In this embodiment, after the S102 of determining a first bit width, a second bit width and a target thinning rate corresponding to the to-be-compressed neural network model, the S103 of obtaining a target value according to the determined first bit width, second bit width and target thinning rate is executed. In this embodiment, the target value obtained in the S103 is used to thin parameters of the to-be-compressed neural network model.

Specifically, in this embodiment, during the S103 of obtaining a target value according to the determined first bit width, second bit width and target thinning rate, an adopted optional implementation may include: calculating a product between the second bit width and the target thinning rate; and taking a division result between the first bit width and the calculated product as the target value.

In this embodiment, the target value may be obtained using the following calculation formula:

$$N = \frac{V}{R \times B}$$

where N represents the target value; R represents the target thinning rate; B represents the second bit width; and V represents the first bit width.

In this embodiment, after the S103 of obtaining a target value, the S104 of compressing the to-be-compressed neural network model using the target value, the first bit width and the second bit width to obtain a compression result of the to-be-compressed neural network model is executed.

Specifically, in this embodiment, during the S104 of compressing the to-be-compressed neural network model using the target value, the first bit width and the second bit width to obtain the compression result of the to-be-compressed neural network model, an adopted optional implementation may include: thinning the parameters in the to-be-compressed neural network model according to the target value, the first bit width and the second bit width to obtain a first neural network model; and obtaining the compression result of the to-be-compressed neural network model according to the first neural network model.

In this embodiment, during the S104 of thinning the parameters in the to-be-compressed neural network model according to the target value, the first bit width and the second bit width to obtain the first neural network model, an adopted optional implementation may include: taking continuous parameters with a number corresponding to a number of the target values in the to-be-compressed neural network model as a parameter unit; sorting the parameters contained in the parameter unit according to an ascending order of absolute values; obtaining a zero setting quantity according to the first bit width, the second bit width and the target value; and setting parameters in the parameter unit of the to-be-compressed neural network model before the zero setting quantity to zero to obtain the first neural network model.

That is, in this embodiment, with the method of setting the parameters with the smaller absolute values in the to-be-compressed neural network model to zero, the to-be-compressed neural network model is compressed, and since the zero setting quantity is determined by combining the first bit width, the second bit width and the target value, accuracy of parameter thinning may be improved, and the compression result of the to-be-compressed neural network model is ensured to have higher precision.

In this embodiment, after the S104 of setting parameters in each parameter unit of the to-be-compressed neural network model before the zero setting quantity to zero, an order of the parameters in each parameter unit may be restored; or a mask sequence corresponding to each parameter unit may be generated, the mask sequence includes 0/1 vectors with a number corresponding to the number of the target values, and the 0/1 vector is used to represent whether a parameter at a certain location is zero.

In this embodiment, after the S104 of obtaining a first neural network model, the obtained first neural network model may be used as the compression result of the to-be-compressed neural network model.

In order to further improve a compression effect of the neural network model, in this embodiment, during the S104 of obtaining a compression result of the to-be-compressed neural network model according to the first neural network model, an adopted optional implementation may include: according to the second bit width, quantifying parameters which are not set to zero in the first neural network model; and taking the neural network model after quantification as the compression result of the to-be-compressed neural network model.

In this embodiment, during the S104 of quantifying parameters which are not set to zero in the first neural network model according to the second bit width, an adopted optional implementation may include: determining a value range according to the second bit width; and representing the parameters which are not set to zero in the first neural network model as values in the determined value range.

That is, in this embodiment, after the parameters in the neural network model are thinned, parameters which are not pruned in the neural network model may be further quantified; that is, the compression result of the to-be-compressed neural network model is obtained by combining thinning and quantification, thus further compressing a volume of the to-be-compressed neural network model.

Figure 2:
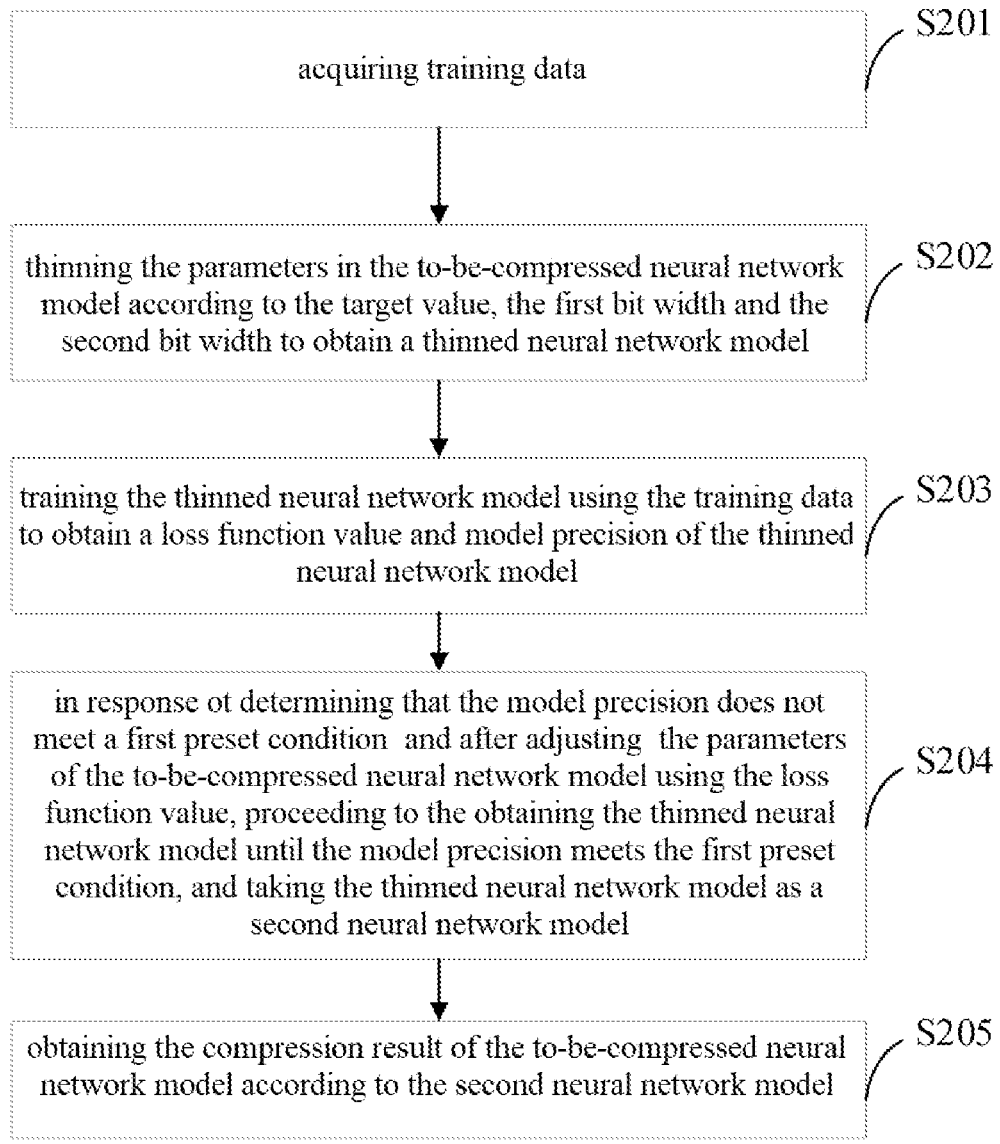
FIG. 2 is a schematic diagram according to a second embodiment of the present disclosure.

FIG. 2 is a schematic diagram according to a second embodiment of the present disclosure. As shown in FIG. 2, in this embodiment, the S104 of compressing the to-be-compressed neural network model using the target value, the first bit width and the second bit width to obtain a compression result of the to-be-compressed neural network model includes the following steps:

S201: acquiring training data;

S202: thinning the parameters in the to-be-compressed neural network model according to the target value, the first bit width and the second bit width to obtain a thinned neural network model;

S203: training the thinned neural network model using the training data to obtain a loss function value and model precision of the thinned neural network model;

S204: in response to determining that the model precision does not meet a first preset condition, and after adjusting the parameters of the to-be-compressed neural network model using the loss function value, proceeding to the step of obtaining a thinned neural network model until the model precision meets the first preset condition, and taking the thinned neural network model as a second neural network model; and S205: obtaining the compression result of the to-be-compressed neural network model according to the second neural network model.

That is, in this embodiment, the to-be-compressed neural network model may also be trained in conjunction with the training data when compressed, so as to obtain the compression result of the trained to-be-compressed model, and by introducing the thinning process of the neural network model in the training process, training performance of the obtained compression result of the to-be-compressed neural network model may be improved.

In this embodiment, during the S201 of acquiring training data, the training data may be acquired according to task information corresponding to the to-be-compressed neural network model, and the acquired training data may correspond to image data of an image recognition task, voice data of a voice recognition task, or the like.

In this embodiment, the process of the S202 of thinning the parameters in the to-be-compressed neural network model according to the target value, the first bit width and the second bit width is the same as the process involved in the S104 in the previous embodiment, and is not repeated herein.

In this embodiment, in the S205, the second neural network model may be directly used as the compression result of the to-be-compressed neural network model.

In addition, in this embodiment, during the S205 of obtaining the compression result of the to-be-compressed neural network model according to the second neural network model, an adopted optional implementation may include: according to the second bit width, quantifying parameters which are not set to zero in the second neural network model to obtain a quantified neural network model; training the quantified neural network model using the training data to obtain a loss function value and model precision of the quantified neural network model; and in response to determining that the model precision does not meet a second preset condition, and after adjusting parameters of the second neural network model using the obtained loss function value, proceeding to the step of obtaining a quantified neural network model until the model precision meets the second preset condition, and taking the quantified neural network model as the compression result of the to-be-compressed neural network model.

In addition, in this embodiment, during the S205 of training the quantified neural network model using the training data, the quantified parameters may also be inversely quantified, and the quantified neural network model is trained using the inversely-quantified parameters.

It may be understood that the first preset condition and the second preset condition in this embodiment may be preset at the input end.

That is, in this embodiment, when the to-be-compressed neural network model is trained, the parameters of the to-be-compressed neural network model are thinned and quantified in the training process, thereby compressing the to-be-compressed neural network model by combining thinning and quantification; and a compression process includes the training process, such that the compression result of the to-be-compressed neural network model obtained in this embodiment has the higher model precision.

Figure 3:
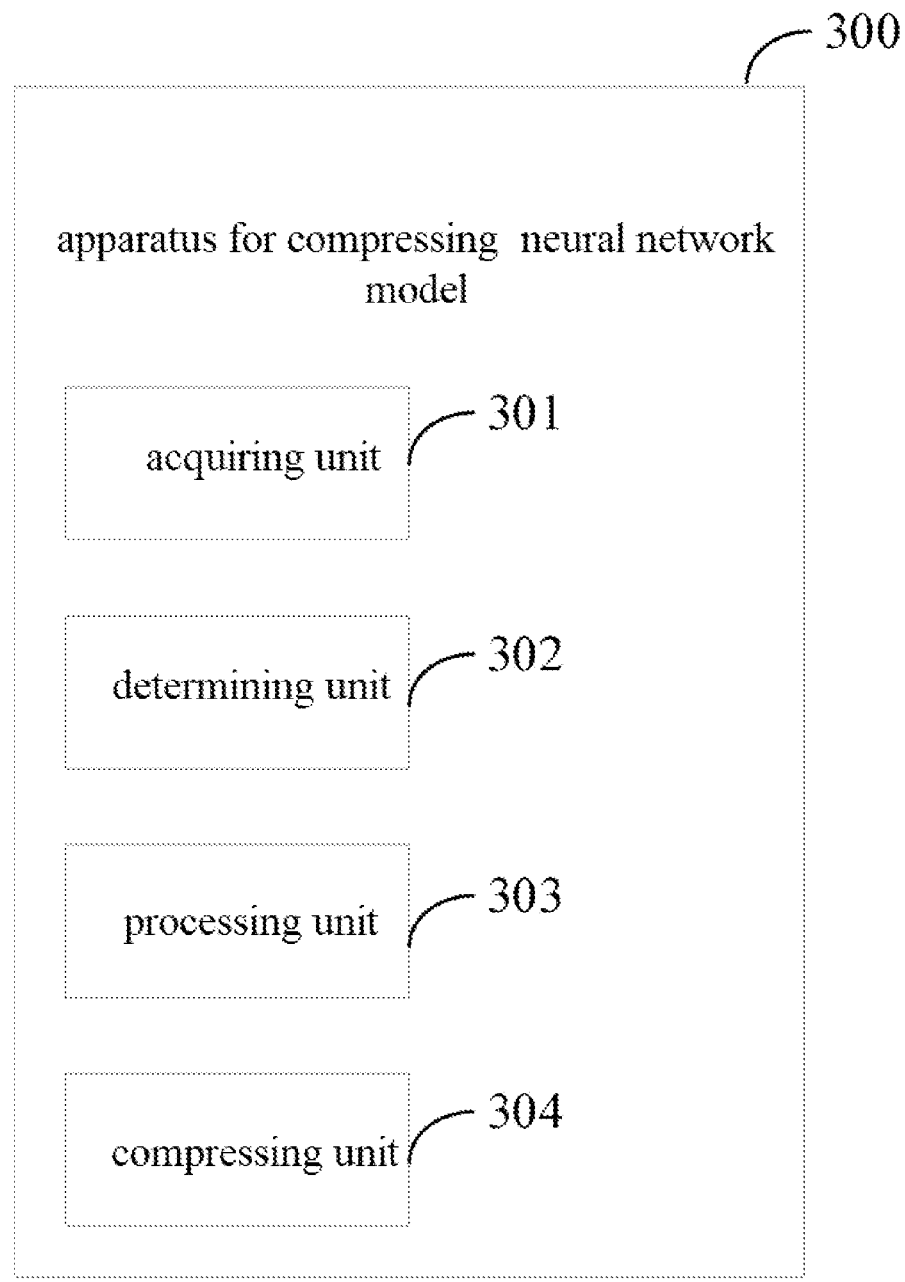
FIG. 3 is a schematic diagram according to a third embodiment of the present disclosure.

FIG. 3 is a schematic diagram according to a third embodiment of the present disclosure. As shown in FIG. 3, an apparatus 300 for compressing a neural network model according to this embodiment includes an acquiring unit 301 configured to acquire a to-be-compressed neural network model; a determining unit 302 configured to determine a first bit width, a second bit width and a target thinning rate corresponding to the to-be-compressed neural network model; a processing unit 303 configured to obtain a target value according to the first bit width, the second bit width and the target thinning rate; and a compressing unit 304 configured to compress the to-be-compressed neural network model using the target value, the first bit width and the second bit width to obtain a compression result of the to-be-compressed neural network model.

When the acquiring unit 301 acquires the to-be-compressed neural network model, a neural network model input at an input end may be used as the to-be-compressed neural network model, or a neural network model selected on a network at the input end may be used as the to-be-compressed neural network model.

In this embodiment, after the acquiring unit 301 acquires the to-be-compressed neural network model, the determining unit 302 determines the first bit width, the second bit width and the target thinning rate corresponding to the acquired to-be-compressed neural network model.

The determining unit 302 may acquire a first bit width, a second bit width and a target thinning rate input or selected at the input end as the first bit width, the second bit width and the target thinning rate corresponding to the acquired to-be-compressed neural network model.

In order to enable the compression result of the to-be-compressed neural network model to be better matched with a processor for running the to-be-compressed neural network model, when the determining unit 302 determines the first bit width corresponding to the to-be-compressed neural network model, an adopted optional implementation may include: determining a processor for running the acquired to-be-compressed neural network model; and taking a vector width of the determined processor as the first bit width corresponding to the to-be-compressed neural network model.

In order to enable the compression result of the to-be-compressed neural network model to be better matched with an instruction set in the processor for running the to-be-compressed neural network model, when the determining unit 302 determines the second bit width corresponding to the to-be-compressed neural network model, an adopted optional implementation may include: determining the processor for running the acquired to-be-compressed neural network model; and determining the second bit width corresponding to the to-be-compressed neural network model according to a vector width of the instruction set in the determined processor.

When the determining unit 302 determines the second bit width corresponding to the to-be-compressed neural network model according to the vector width of the instruction set in the determined processor, a vector width of an instruction set supported by the instruction set may be directly used as the second bit width, or a vector width less than the vector width of the instruction supported by the instruction set may be used as the second bit width.

In addition, when the determining unit 302 determines the target thinning rate corresponding to the to-be-compressed neural network model, an adopted optional implementation may include: acquiring attribute information of the to-be-compressed neural network model; and taking a thinning rate corresponding to the determined attribute information as the target thinning rate corresponding to the to-be-compressed neural network model.

That is, the determining unit 302 may preset a corresponding relationship between the attribute information and the thinning rate, and then determine the target thinning rate according to the attribute information of the to-be-compressed neural network model, thus avoiding that the compression result of the to-be-compressed neural network model is affected by an inappropriate target thinning rate, and then improving accuracy of the determined target thinning rate.

In this embodiment, after the determining unit 302 determines the first bit width, the second bit width and the target thinning rate corresponding to the to-be-compressed neural network model, the processing unit 303 obtains the target value according to the determined first bit width, second bit width and target thinning rate. The target value obtained by the processing unit 303 is used to thin parameters of the to-be-compressed neural network model.

Specifically, when the processing unit 303 obtains the target value according to the determined first bit width, second bit width and target thinning rate, an adopted optional implementation may include: calculating a product between the second bit width and the target thinning rate; and taking a division result between the first bit width and the calculated product as the target value.

In this embodiment, after the processing unit 303 obtains the target value, the compressing unit 304 compresses the to-be-compressed neural network model using the target value, the first bit width and the second bit width to obtain the compression result of the to-be-compressed neural network model.

Specifically, when the compressing unit 304 compresses the to-be-compressed neural network model using the target value, the first bit width and the second bit width to obtain the compression result of the to-be-compressed neural network model, an adopted optional implementation may include: thinning the parameters in the to-be-compressed neural network model according to the target value, the first bit width and the second bit width to obtain a first neural network model; and obtaining the compression result of the to-be-compressed neural network model according to the first neural network model.

When the compressing unit 304 thins the parameters in the to-be-compressed neural network model according to the target value, the first bit width and the second bit width to obtain the first neural network model, an adopted optional implementation may include: taking continuous parameters with a number corresponding to a number of the target values in the to-be-compressed neural network model as a parameter unit; sorting the parameters contained in the parameter unit according to an ascending order of absolute values; obtaining a zero setting quantity according to the first bit width, the second bit width and the target value; and setting parameters in the parameter unit of the to-be-compressed neural network model before the zero setting quantity to zero to obtain the first neural network model.

That is, with the method of setting the parameters with the smaller absolute values in the to-be-compressed neural network model to zero, the compressing unit 304 compresses the to-be-compressed neural network model, and since the zero setting quantity is determined by combining the first bit width, the second bit width and the target value, accuracy of parameter thinning may be improved, and the compression result of the to-be-compressed neural network model is ensured to have higher precision.

After setting the parameters in each parameter unit of the to-be-compressed neural network model before the zero setting quantity to zero, the compressing unit 304 may restore an order of the parameters in each parameter unit; or generate a mask sequence corresponding to each parameter unit, the mask sequence includes 0/1 vectors with a number corresponding to the number of the target values, and the 0/1 vector is used to represent whether a parameter at a certain location is zero.

After obtaining the first neural network model, the compressing unit 304 may use the obtained first neural network model as the compression result of the to-be-compressed neural network model.

In order to further improve a compression effect of the neural network model, when the compressing unit 304 obtains the compression result of the to-be-compressed neural network model according to the first neural network model, an adopted optional implementation may include: according to the second bit width, quantifying parameters which are not set to zero in the first neural network model; and taking the neural network model after quantification as the compression result of the to-be-compressed neural network model.

When the compressing unit 304 quantifies the parameters which are not set to zero in the first neural network model according to the second bit width, an adopted optional implementation may include: determining a value range according to the second bit width; and representing the parameters which are not set to zero in the first neural network model as values in the determined value range.

That is, after thinning the parameters in the neural network model, the compressing unit 304 may further quantify parameters which are not pruned in the neural network model; that is, the compression result of the to-be-compressed neural network model is obtained by combining thinning and quantification, thus further compressing a volume of the to-be-compressed neural network model.

In addition, when the compressing unit 304 compresses the to-be-compressed neural network model using the target value, the first bit width and the second bit width to obtain the compression result of the to-be-compressed neural network model, an adopted method may include: acquiring training data; thinning the parameters in the to-be-compressed neural network model according to the target value, the first bit width and the second bit width to obtain a thinned neural network model; training the thinned neural network model using the training data to obtain a loss function value and model precision of the thinned neural network model; in response to determining that the model precision does not meet a first preset condition, and after adjusting the parameters of the to-be-compressed neural network model using the loss function value, proceeding to the step of obtaining a thinned neural network model until the model precision meets the first preset condition, and taking the thinned neural network model as a second neural network model; and obtaining the compression result of the to-be-compressed neural network model according to the second neural network model.

That is, the compressing unit 304 may train the to-be-compressed neural network model in conjunction with the training data when compressing the to-be-compressed neural network model, so as to obtain the compression result of the trained to-be-compressed model, and by introducing the thinning process of the neural network model in the training process, training performance of the obtained compression result of the to-be-compressed neural network model may be improved.

When acquiring the training data, the compressing unit 304 may acquire the training data according to task information corresponding to the to-be-compressed neural network model, and the acquired training data may correspond to image data of an image recognition task, voice data of a voice recognition task, or the like.

The compressing unit 304 may directly use the second neural network model as the compression result of the to-be-compressed neural network model.

In addition, when the compressing unit 304 obtains the compression result of the to-be-compressed neural network model according to the second neural network model, an adopted optional implementation may include: according to the second bit width, quantifying parameters which are not set to zero in the second neural network model to obtain a quantified neural network model; training the quantified neural network model using the training data to obtain a loss function value and model precision of the quantified neural network model; and in response to determining that the model precision does not meet a second preset condition, and after adjusting parameters of the second neural network model using the obtained loss function value, proceeding to the step of obtaining a quantified neural network model until the model precision meets the second preset condition, and taking the quantified neural network model as the compression result of the to-be-compressed neural network model.

In addition, when training the quantified neural network model using the training data, the compressing unit 304 may inversely quantify the quantified parameters, and train the quantified neural network model using the inversely-quantified parameters.

That is, when training the to-be-compressed neural network model, the compressing unit 304 may thin and quantify the parameters of the to-be-compressed neural network model in the training process, thereby compressing the to-be-compressed neural network model by combining thinning and quantification; and a compression process includes the training process, such that the compression result of the to-be-compressed neural network model obtained in this embodiment has the higher model precision.

Figure 4:
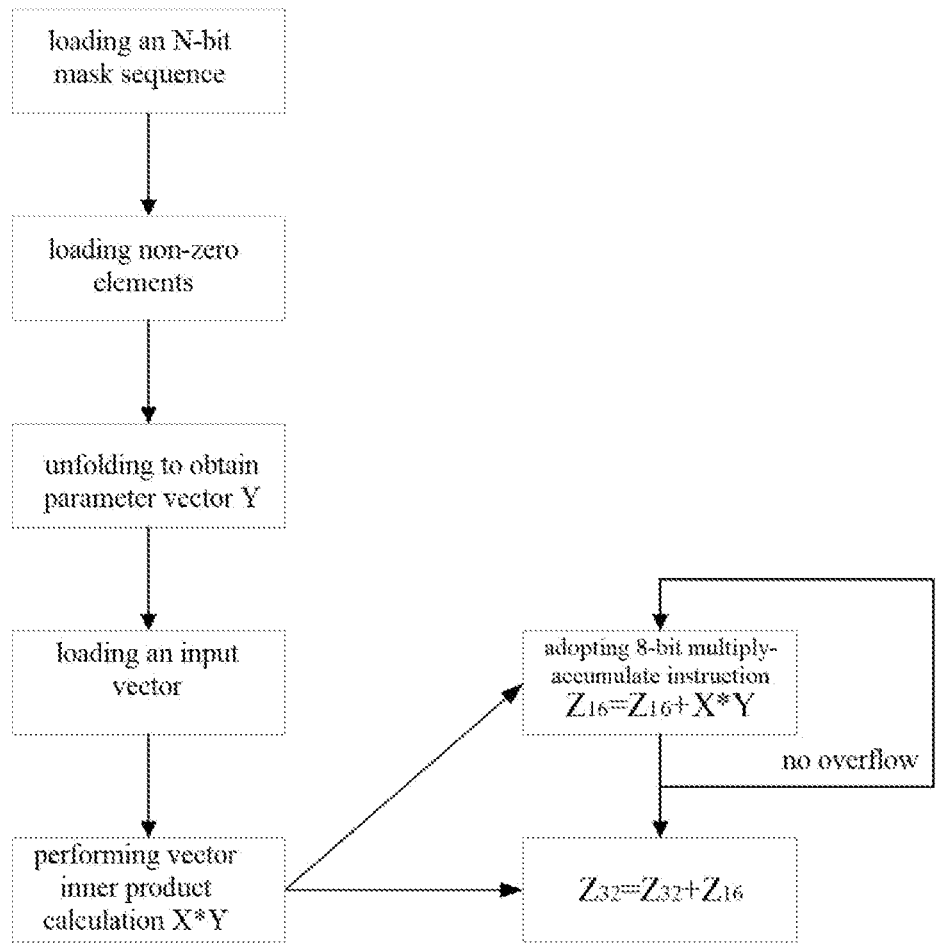
FIG. 4 is a schematic diagram according to a fourth embodiment of the present disclosure.

FIG. 4 is a schematic diagram according to a fourth embodiment of the present disclosure. FIG. 4 shows a flow chart of calculation of a fully-connected layer of the to-be-compressed neural network model in the above embodiment, and the fully-connected layer has input vector X and parameter unit Y; an N-bit mask sequence corresponding to the parameter unit Y is loaded; parameters at corresponding positions in the parameter unit Y are set to zero according to the loaded N-bit mask sequence, and non-zero parameters are unfolded to obtain parameter vector Y; the input vector X is loaded; and vector inner product calculation X*Y is performed.

If the input vector X has a value range $[-2^7+1, 2^7-1]$, the second bit width is B, and the parameter vector Y has a value range $[-2^B+1, 2^B-1]$, when the fully-connected layer performs the vector inner product calculation, the maximum value of a vector inner product between X and Y is $2^B+6$.

If a 16-bit signed value is used for storage, $2^{15}/2^{B+6}=2^{9-B}$ accumulation processes may be performed at most; when B is 8, two accumulation processes require overflow to a 32-bit signed value for storage (as shown on the right of FIG. 4); with a decrease of B, a number of accumulation times becomes larger, and therefore, quantification of the parameters using the second bit width in the above embodiment may reduce a requirement for a storage space, thereby compressing the to-be-compressed neural network model.

Figure 5:
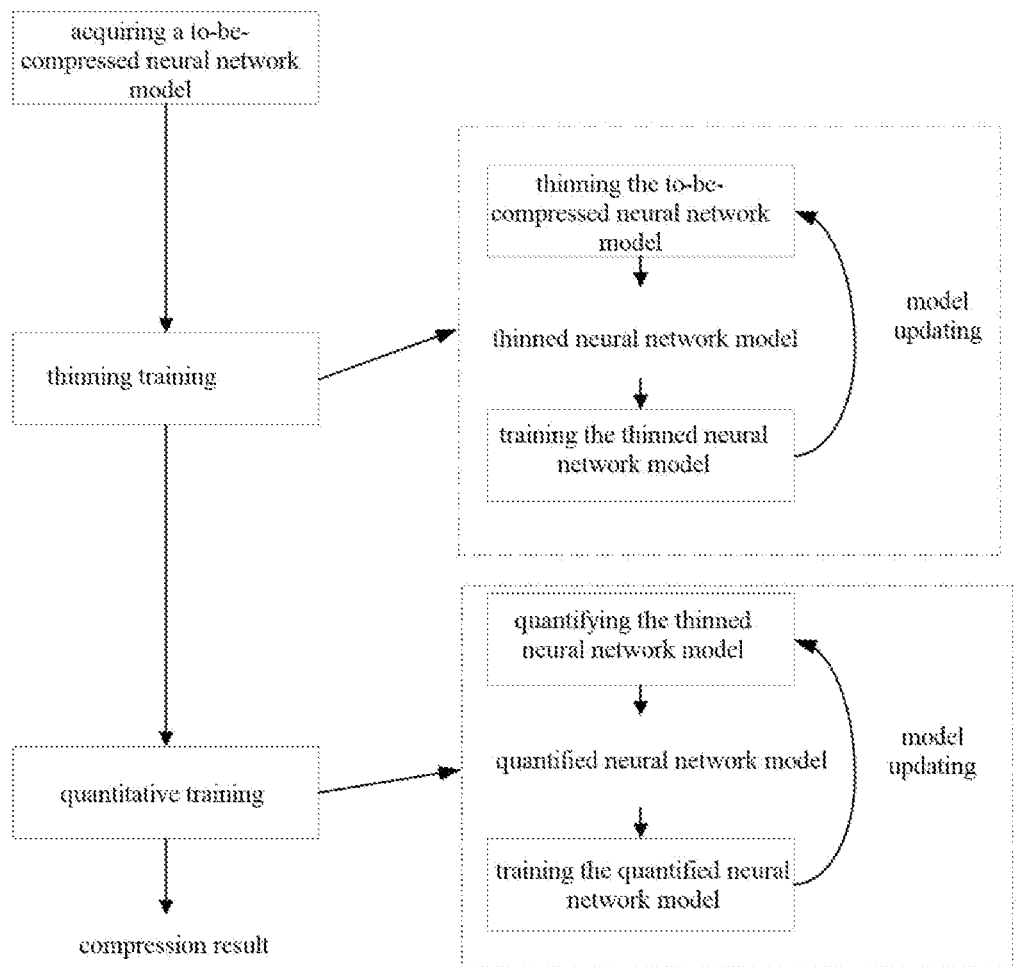
FIG. 5 is a schematic diagram according to a fifth embodiment of the present disclosure.

FIG. 5 is a schematic diagram according to a fifth embodiment of the present disclosure. FIG. 5 shows a flow chart of obtaining a compression result of a to-be-compressed neural network model by means of training: firstly, acquiring the to-be-compressed neural network model, where the to-be-compressed neural network model may be a neural network model obtained through a common training step (i.e., training directly using acquired training data); then, performing a thinning training operation on the to-be-compressed neural network model, which specifically includes: thinning the to-be-compressed neural network model to obtain a thinned neural network model, training the thinned neural network model using the acquired training data, updating the model, repeating the above steps until model precision of the thinned neural network model reaches an expected value, and outputting the thinned neural network model; and finally, performing a quantitative training operation on the thinned neural network model, which specifically includes: quantifying parameters which are not set to zero in the thinned neural network model to obtain a quantified neural network model, training the quantified neural network model using training data, updating the model, repeating the above steps until model precision of the quantified neural network model reaches an expected value, and outputting the quantified neural network model as the compression result of the to-be-compressed neural network model.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 6:
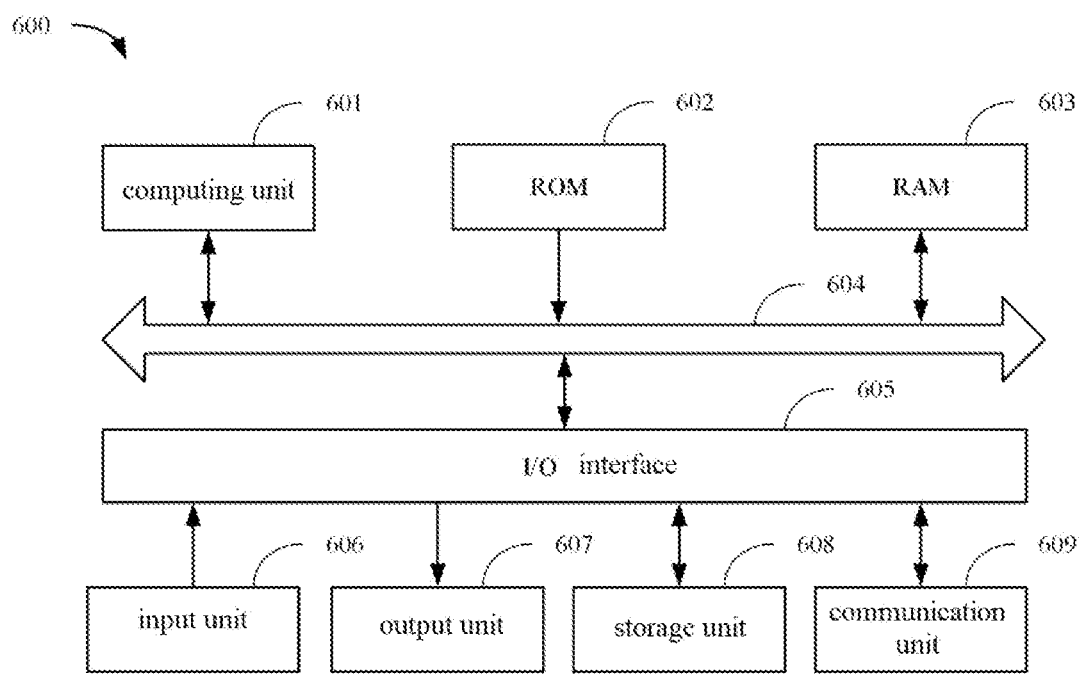
FIG. 6 is a block diagram of an electronic device configured to implement a method for compressing a neural network model according to the embodiment of the present disclosure.

FIG. 6 is a block diagram of an electronic device configured to implement a method for compressing a neural network model according to the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the method for compressing a neural network model. For example, in some embodiments, the method for compressing a neural network model may be implemented as a computer software program tangibly contained in a machine readable medium, such as the storage unit 608.

In some embodiments, part or all of the computer program may be loaded and/or installed into the device 600 via the ROM 602 and/or the communication unit 609. When the computer program is loaded into the RAM 603 and executed by the computing unit 601, one or more steps of the method for compressing a neural network model described above may be performed. Alternatively, in other embodiments, the computing unit 601 may be configured to perform the method for compressing a neural network model by any other suitable means (for example, by means of firmware).

Various implementations of the systems and technologies described herein may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A method for compressing a neural network model, comprising:
    acquiring a to-be-compressed neural network model;
    determining a first bit width, a second bit width and a target thinning rate corresponding to the to-be-compressed neural network model, wherein the first bit width and the second bit width are determined based on a processor for running the to-be-compressed neural network model;
    obtaining a target value according to the first bit width, the second bit width and the target thinning rate, which comprises: calculating a product between the second bit width and the target thinning rate; and taking a division result between the first bit width and the product as the target value; and
    compressing the to-be-compressed neural network model using the target value, the first bit width and the second bit width to obtain a compression result of the to-be-compressed neural network model.

2. The method according to claim 1, wherein the determining the first bit width corresponding to the to-be-compressed neural network model comprises:
    determining the processor for running the to-be-compressed neural network model; and
    taking a vector width of the processor as the first bit width corresponding to the to-be-compressed neural network model.

3. The method according to claim 1, wherein the determining the second bit width corresponding to the to-be-compressed neural network model comprises:
    determining the processor for running the to-be-compressed neural network model; and
    determining the second bit width corresponding to the to-be-compressed neural network model according to a vector width of an instruction set in the processor.

4. The method according to claim 1, wherein the determining the target thinning rate corresponding to the to-be-compressed neural network model comprises:
    acquiring attribute information of the to-be-compressed neural network model; and
    taking a thinning rate corresponding to the attribute information as the target thinning rate corresponding to the to-be-compressed neural network model.

5. The method according to claim 1, wherein the compressing the to-be-compressed neural network model using the target value, the first bit width and the second bit width to obtain the compression result of the to-be-compressed neural network model comprises:
    thinning parameters in the to-be-compressed neural network model according to the target value, the first bit width and the second bit width to obtain a first neural network model; and
    obtaining the compression result of the to-be-compressed neural network model according to the first neural network model.

6. The method according to claim 5, wherein the thinning parameters in the to-be-compressed neural network model according to the target value, the first bit width and the second bit width to obtain the first neural network model comprises:

taking continuous parameters with a number corresponding to a number of the target values in the to-be-compressed neural network model as a parameter unit;
sorting the parameters contained in the parameter unit according to an ascending order of absolute values;
obtaining a zero setting quantity according to the first bit width, the second bit width and the target value; and
setting parameters in the parameter unit of the to-be-compressed neural network model before the zero setting quantity to zero to obtain the first neural network model.

7. The method according to claim 5, wherein the obtaining the compression result of the to-be-compressed neural network model according to the first neural network model comprises:
according to the second bit width, quantifying parameters which are not set to zero in the first neural network model; and
taking the neural network model after quantification as the compression result of the to-be-compressed neural network model.

8. The method according to claim 1, wherein the compressing the to-be-compressed neural network model using the target value, the first bit width and the second bit width to obtain the compression result of the to-be-compressed neural network model comprises:
acquiring training data;
thinning parameters in the to-be-compressed neural network model according to the target value, the first bit width and the second bit width to obtain a thinned neural network model;
training the thinned neural network model using the training data to obtain a loss function value and model precision of the thinned neural network model;
in response to determining that the model precision does not meet a first preset condition and after adjusting the parameters of the to-be-compressed neural network model using the loss function value, proceeding to the obtaining the thinned neural network model until the model precision meets the first preset condition, and taking the thinned neural network model as a second neural network model; and
obtaining the compression result of the to-be-compressed neural network model according to the second neural network model.

9. The method according to claim 8, wherein the obtaining the compression result of the to-be-compressed neural network model according to the second neural network model comprises:
quantifying, according to the second bit width, parameters which are not set to zero in the second neural network model to obtain a quantified neural network model;
training the quantified neural network model using the training data to obtain a loss function value and model precision of the quantified neural network model; and
in response to determining that the model precision does not meet a second preset condition, and after adjusting parameters of the second neural network model using the loss function value, proceeding to the obtaining the quantified neural network model until the model precision meets the second preset condition, and taking the quantified neural network model as the compression result of the to-be-compressed neural network model.

10. An electronic device, comprising:
at least one processor; and
a memory connected with the at least one processor communicatively;
wherein the memory stores instructions executable by the at least one processor to enable the at least one processor to perform a method for compressing a neural network model comprising:
acquiring a to-be-compressed neural network model;
determining a first bit width, a second bit width and a target thinning rate corresponding to the to-be-compressed neural network model, wherein the first bit width and the second bit width are determined based on a processor for running the to-be-compressed neural network model;
obtaining a target value according to the first bit width, the second bit width and the target thinning rate, which comprises: calculating a product between the second bit width and the target thinning rate; and taking a division result between the first bit width and the product as the target value; and
compressing the to-be-compressed neural network model using the target value, the first bit width and the second bit width to obtain a compression result of the to-be-compressed neural network model.

11. The electronic device according to claim 10, wherein the determining the first bit width, the second bit width and the target thinning rate corresponding to the to-be-compressed neural network model comprises:
determining the processor for running the to-be-compressed neural network model;
acquiring attribute information of the to-be-compressed neural network model;
taking a vector width of the processor as the first bit width corresponding to the to-be-compressed neural network model;
determining the second bit width corresponding to the to-be-compressed neural network model according to a vector width of an instruction set in the processor; and
taking a thinning rate corresponding to the attribute information as the target thinning rate corresponding to the to-be-compressed neural network model.

12. The electronic device according to claim 10, wherein the compressing the to-be-compressed neural network model using the target value, the first bit width and the second bit width to obtain the compression result of the to-be-compressed neural network model comprises:
thinning parameters in the to-be-compressed neural network model according to the target value, the first bit width and the second bit width to obtain a first neural network model; and
obtaining the compression result of the to-be-compressed neural network model according to the first neural network model.

13. The electronic device according to claim 10, wherein the compressing the to-be-compressed neural network model using the target value, the first bit width and the second bit width to obtain the compression result of the to-be-compressed neural network model comprises:
acquiring training data;
thinning parameters in the to-be-compressed neural network model according to the target value, the first bit width and the second bit width to obtain a thinned neural network model;
training the thinned neural network model using the training data to obtain a loss function value and model precision of the thinned neural network model;
in response to determining that the model precision does not meet a first preset condition and after adjusting the parameters of the to-be-compressed neural network model using the loss function value, proceeding to the obtaining the thinned neural network model until the model precision meets the first preset condition, and taking the thinned neural network model as a second neural network model; and obtaining the compression result of the to-be-compressed neural network model according to the second neural network model.

14. A non-transitory computer readable storage medium with computer instructions stored thereon, wherein the computer instructions are used for causing a computer to perform a method for compressing a neural network model comprising:

acquiring a to-be-compressed neural network model;

determining a first bit width, a second bit width and a target thinning rate corresponding to the to-be-compressed neural network model, wherein the first bit width and the second bit width are determined based on a processor for running the to-be-compressed neural network model;

obtaining a target value according to the first bit width, the second bit width and the target thinning rate, which comprises: calculating a product between the second bit width and the target thinning rate; and taking a division result between the first bit width and the product as the target value; and compressing the to-be-compressed neural network model using the target value, the first bit width and the second bit width to obtain a compression result of the to-be-compressed neural network model.

15. The non-transitory computer readable storage medium according to claim 14, wherein the determining the first bit width, the second bit width and the target thinning rate corresponding to the to-be-compressed neural network model comprises:

determining the processor for running the to-be-compressed neural network model;

acquiring attribute information of the to-be-compressed neural network model;

taking a vector width of the processor as the first bit width corresponding to the to-be-compressed neural network model;

determining the second bit width corresponding to the to-be-compressed neural network model according to a vector width of an instruction set in the processor; and taking a thinning rate corresponding to the attribute information as the target thinning rate corresponding to the to-be-compressed neural network model.

16. The non-transitory computer readable storage medium according to claim 14, wherein the compressing the to-be-compressed neural network model using the target value, the first bit width and the second bit width to obtain the compression result of the to-be-compressed neural network model comprises:

thinning parameters in the to-be-compressed neural network model according to the target value, the first bit width and the second bit width to obtain a first neural network model; and obtaining the compression result of the to-be-compressed neural network model according to the first neural network model.

17. The non-transitory computer readable storage medium according to claim 14, wherein the compressing the to-be-compressed neural network model using the target value, the first bit width and the second bit width to obtain the compression result of the to-be-compressed neural network model comprises:

acquiring training data;

thinning parameters in the to-be-compressed neural network model according to the target value, the first bit width and the second bit width to obtain a thinned neural network model;

training the thinned neural network model using the training data to obtain a loss function value and model precision of the thinned neural network model;

in response to determining that the model precision does not meet a first preset condition and after adjusting the parameters of the to-be-compressed neural network model using the loss function value, proceeding to the obtaining the thinned neural network model until the model precision meets the first preset condition, and taking the thinned neural network model as a second neural network model; and obtaining the compression result of the to-be-compressed neural network model according to the second neural network model.

\* \* \* \* \*